US010382977B2

(12) United States Patent
 Durvasula et al.

(10) Patent No.: US 10,382,977 B2
(45) Date of Patent: Aug. 13, 2019

(54) APPARATUS AND METHOD FOR MONITORING OPERATIONS IN A SATELLITE COMMUNICATION SYSTEM

(71) Applicant: Hughes Network Systems, LLC, Germantown, MD (US)

(72) Inventors: Bhanu Durvasula, Potomac, MD (US); Pratap Dash, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 103 days.

(21) Appl. No.: 14/564,785

(22) Filed: Dec. 9, 2014

(65) Prior Publication Data

US 2016/0165456 A1 Jun. 9, 2016

(51) Int. Cl.
| | |
|---|---|
| H04L 12/26 | (2006.01) |
| H04W 16/28 | (2009.01) |
| H04W 24/08 | (2009.01) |
| H04W 72/04 | (2009.01) |
| H04B 7/185 | (2006.01) |
| G06T 5/20 | (2006.01) |
| G06T 17/05 | (2011.01) |
| G06T 19/20 | (2011.01) |
| H04W 28/08 | (2009.01) |
| G06T 11/00 | (2006.01) |
| H04B 7/204 | (2006.01) |

(Continued)

(52) U.S. Cl.
CPC ........... *H04W 16/28* (2013.01); *G06T 11/001* (2013.01); *G06T 17/05* (2013.01); *G06T 19/20* (2013.01); *H04B 7/1851* (2013.01); *H04B 7/18513* (2013.01); *H04B 7/2041* (2013.01); *H04L 43/045* (2013.01); *H04L 43/08* (2013.01); *H04W 24/08* (2013.01); *H04W 28/085* (2013.01); *G06T 2200/24* (2013.01); *G06T 2219/2012* (2013.01); *G06T 2219/2016* (2013.01); *H04W 74/0833* (2013.01); *H04W 84/06* (2013.01)

(58) Field of Classification Search
None
See application file for complete search history.

(56) References Cited

U.S. PATENT DOCUMENTS

| | | | | |
|---|---|---|---|---|
| 5,991,633 A | * | 11/1999 | Corriveau | ............ H04W 28/06 455/466 |
| H001836 H | * | 2/2000 | Fletcher | ................. G06F 9/542 455/433 |

(Continued)

OTHER PUBLICATIONS

International Search Report in PCT/US2015/064738, dated Feb. 23, 2016.

*Primary Examiner* — Mansour Oveissi
*Assistant Examiner* — Jonathan Wood
(74) *Attorney, Agent, or Firm* — Jones Robb, PLLC (57) ABSTRACT

An approach for monitoring operations in a satellite communication system includes selecting different types of beams that can be used to represent a satellite coverage area, and retrieving metrics from at least one subsystem in a satellite communication system. A map of the satellite coverage area is overlaid with a plurality of coverage beams in accordance with their respective coverage portions of the satellite coverage area. A color scheme can then be applied to provide status information for each coverage beam corresponding to retrieved metrics.

19 Claims, 10 Drawing Sheets

(51) Int. Cl.
*H04W 74/08* (2009.01)
*H04W 84/06* (2009.01)

(56) References Cited

U.S. PATENT DOCUMENTS

| | | | | |
|---|---|---|---|---|
| 6,173,178 B1* | 1/2001 | Hammill | ............... | H04B 7/2041 455/12.1 |
| 6,208,836 B1* | 3/2001 | Albuquerque Moraes | ................. | H04B 7/18534 455/13.1 |
| 6,269,242 B1* | 7/2001 | Leopold | ............... | H04B 7/2041 455/12.1 |
| 6,421,528 B1* | 7/2002 | Rosen | ................ | H04B 7/18513 455/13.3 |
| 6,606,309 B1* | 8/2003 | Wang | ................ | H04W 74/0866 370/322 |
| 6,879,808 B1* | 4/2005 | Nations | ............... | H04B 7/18586 455/12.1 |
| 6,992,991 B2* | 1/2006 | Duske, Jr. | .......... | H04B 7/18567 370/316 |
| 7,184,761 B1* | 2/2007 | Wang | ..................... | H04B 7/195 342/372 |
| 7,324,465 B2* | 1/2008 | Lim | .................. | H04B 7/18558 370/278 |
| 7,693,702 B1* | 4/2010 | Kerner | ................. | G06T 19/006 345/629 |
| 7,716,662 B2* | 5/2010 | Seiden | ...................... | G06F 8/61 717/173 |
| 8,265,646 B2* | 9/2012 | Agarwal | ............ | H04B 7/18515 370/395.41 |
| 8,351,383 B2* | 1/2013 | Agarwal | ............ | H04B 7/18539 370/316 |
| 8,433,332 B2* | 4/2013 | Agarwal | ............ | H04B 7/18515 370/395.41 |
| 8,831,598 B1* | 9/2014 | Clemmensen | .......... | H04W 8/20 455/427 |
| 9,113,352 B2* | 8/2015 | Agarwal | ............... | H04W 24/02 |
| 9,551,774 B2* | 1/2017 | Ishida | ...................... | G01S 1/04 |
| 9,748,989 B1* | 8/2017 | Freedman | ................ | H04B 1/12 |
| 2001/0036826 A1* | 11/2001 | Norin | .................. | H04B 7/2041 455/429 |
| 2002/0018023 A1* | 2/2002 | Durham | ................. | H01Q 1/288 343/781 P |
| 2002/0032003 A1* | 3/2002 | Avitzour | ............ | H04B 7/18519 455/12.1 |
| 2002/0118661 A1* | 8/2002 | Voce | ................. | H04W 74/0841 370/337 |
| 2004/0017332 A1* | 1/2004 | Rao | ..................... | H01Q 15/148 343/912 |
| 2005/0054288 A1* | 3/2005 | Agarwal | ............ | H04B 7/18513 455/13.1 |
| 2007/0192805 A1* | 8/2007 | Dutta | ................ | H04B 7/18563 725/64 |
| 2008/0287123 A1* | 11/2008 | Giloh | ................ | H04B 7/18567 455/427 |
| 2008/0293355 A1* | 11/2008 | Giloh | ................ | H04B 7/18567 455/3.02 |
| 2010/0015987 A1* | 1/2010 | Katori | .................. | H04W 16/02 455/450 |
| 2010/0062706 A1 | 3/2010 | Mills et al. | | |
| 2010/0195564 A1* | 8/2010 | Jong | .................. | H04B 7/18513 370/326 |
| 2010/0235285 A1* | 9/2010 | Hoffberg | ............. | G06Q 20/401 705/75 |
| 2010/0325259 A1* | 12/2010 | Schuler | ............... | G06F 11/3055 709/224 |
| 2011/0081855 A1* | 4/2011 | Casagrande | ........... | H04H 60/13 455/3.02 |
| 2011/0223918 A1* | 9/2011 | Dahlen | ................. | H04W 24/00 455/436 |
| 2011/0250883 A1* | 10/2011 | Pyhtila | .................. | H04W 24/08 455/424 |
| 2012/0184253 A1* | 7/2012 | Hsu | ........................ | H04W 4/00 455/414.1 |
| 2013/0070666 A1* | 3/2013 | Miller | .................... | H04B 7/212 370/326 |
| 2013/0088391 A1* | 4/2013 | Corman | .................. | H04B 7/10 342/365 |
| 2013/0109376 A1* | 5/2013 | Roos | .................. | H04B 7/2041 455/427 |
| 2013/0135994 A1* | 5/2013 | Michel | ............. | H04W 52/0206 370/229 |
| 2013/0148571 A1* | 6/2013 | Miller | ................... | H04W 24/02 370/316 |
| 2013/0329630 A1* | 12/2013 | Becker | ............. | H04W 56/0015 370/326 |
| 2014/0044058 A1* | 2/2014 | El-Saidny | ........... | H04W 72/048 370/329 |
| 2014/0045420 A1* | 2/2014 | Tong | .................. | H04B 7/18506 455/12.1 |
| 2014/0057626 A1 | 2/2014 | Uelk et al. | | |
| 2014/0099884 A1* | 4/2014 | Lozano | ................ | H04M 15/81 455/12.1 |
| 2014/0128057 A1* | 5/2014 | Siomina | ................ | H04J 3/0685 455/423 |
| 2014/0177521 A1 | 6/2014 | Agarwal | | |
| 2015/0016289 A1* | 1/2015 | Yun | ...................... | H04W 24/02 370/252 |
| 2015/0063203 A1* | 3/2015 | Kim | .................. | H04B 7/18513 370/326 |
| 2015/0095948 A1* | 4/2015 | Kummer | ............. | H04N 21/6143 725/35 |
| 2015/0123843 A1* | 5/2015 | Lier | ...................... | H04K 3/228 342/352 |
| 2015/0146631 A1* | 5/2015 | Kim | ................. | H04W 74/0833 370/329 |
| 2016/0034305 A1* | 2/2016 | Shear | ....................... | G06F 9/50 707/722 |
| 2016/0044517 A1* | 2/2016 | Raghavan | ............. | H04W 16/28 370/329 |
| 2016/0088502 A1* | 3/2016 | Sanneck | ............. | H04W 24/08 370/242 |
| 2016/0192172 A1* | 6/2016 | Kim | ................. | G08G 1/096791 370/329 |
| 2017/0064742 A1* | 3/2017 | Ramos | ................. | H04W 64/00 |

* cited by examiner

APPARATUS AND METHOD FOR MONITORING OPERATIONS IN A SATELLITE COMMUNICATION SYSTEM

BACKGROUND INFORMATION

Modern communication systems allow consumers to maintain connectivity, regardless of their location. Many consumers are capable of utilizing different types of terminals (e.g., mobile phones, satellite phones, etc.) while traveling or moving through different geographic locations. Satellite communication systems are at least one type of communication system which facilitate such mobility to consumers. As the number of consumers and desired content increases, it also becomes necessary to monitor system status in order to maintain appropriate quality of service.

Communication systems, such as satellite communication systems, are extremely complicated and incorporate a large number of subsystems which must be properly integrated for proper functionality. In order to quickly assess overall system status, it is necessary to obtain, observe, and analyze various operational metrics associated with key systems and subsystems. Conventional system monitoring typically requires data collection from various systems and offline analysis thereof. Oftentimes, however, results of the data analysis are obtained after certain problems have persisted over extended periods of time. Furthermore, the communication system may experience intermittent and/or temporal complications that occur at various points during the day. Although such complications can severely affect the overall system functionality, they cannot be easily observed and/or addressed through offline analysis. It would therefore be desirable to quickly monitor and analyze the overall status and quality of a communication system in real-time.

BRIEF SUMMARY

An apparatus and method for monitoring operations in a satellite communication system, is described. According to an embodiment, an apparatus includes a base station for processing data within a satellite communication system and maintaining metrics for at least one subsystem within the satellite communication system. The apparatus also includes a processor configured to select one or more beam types for representing a satellite coverage area, retrieve metrics from the at least one subsystem in a satellite communication system, and display a map of the satellite coverage area. The processor is further configured to overlay a plurality of coverage beams from each of the selected one or more beam types on the map in accordance with their respective coverage portions of the satellite coverage area, and apply a color scheme to provide status information for each coverage beam corresponding to retrieved metrics, the status information being obtained from the retrieved metrics.

According to another embodiment, selecting one or more beam types for representing a satellite coverage area; retrieving metrics from at least one subsystem in a satellite communication system; displaying a map of the satellite coverage area; overlaying a plurality of coverage beams from each of the selected one or more beam types on the map in accordance with their respective coverage portions of the satellite coverage area; and applying a color scheme to provide status information for each coverage beam corresponding to retrieved metrics, the status information being obtained, at least in part, from the retrieved metrics.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus and method for monitoring operations in a satellite communication system, is described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
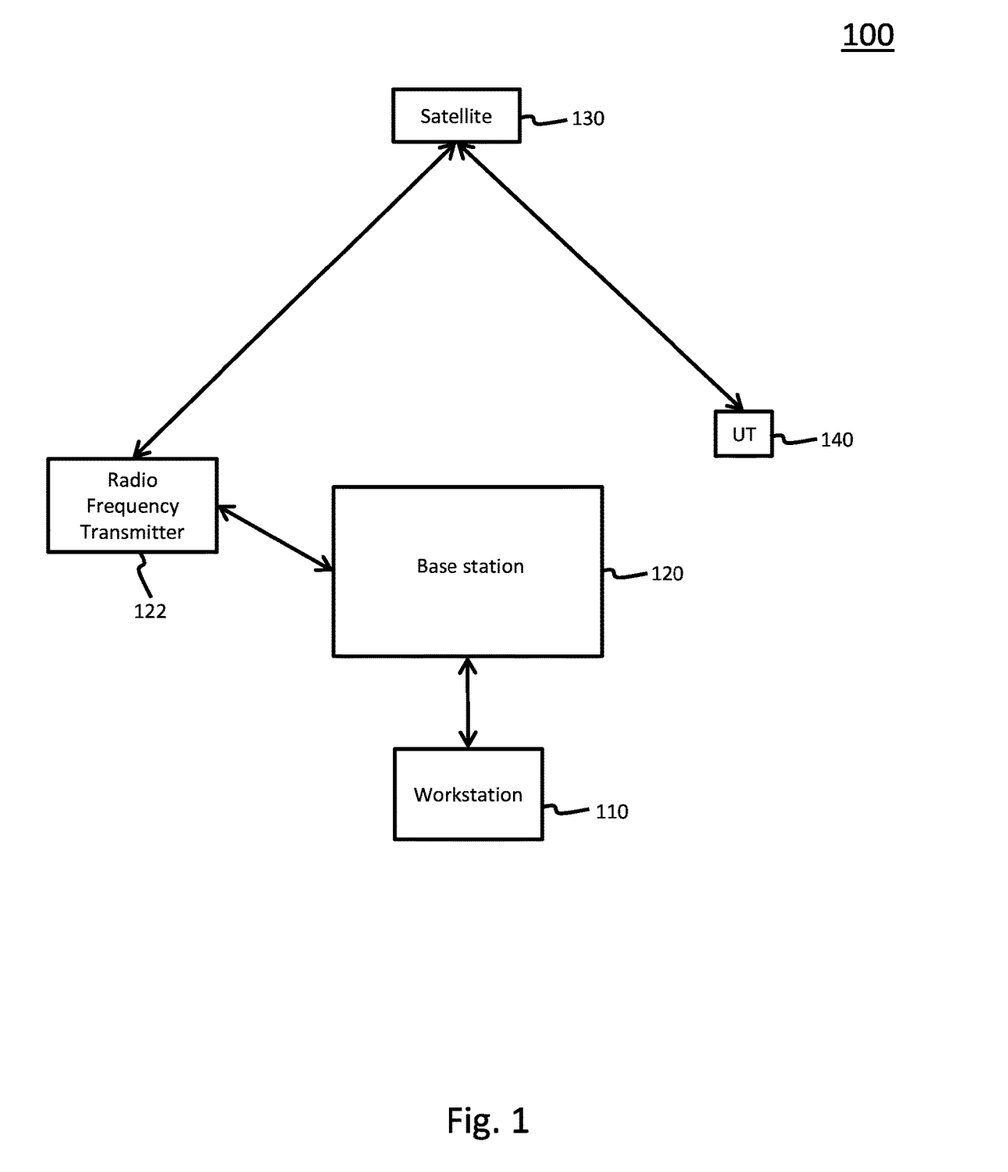
FIG. 1 is a diagram illustrating a system for viewing operational functions in a satellite communication system, according to at least one embodiment.

FIG. 1 is a block diagram illustrating a system 100 for viewing operational functions in a satellite communication system, according to at least one embodiment. The system 100 includes a terminal 110, such as a personal computer (PC), which allows an operator to control various parameters that are used in connection with viewing operations of the system. According to various embodiments, different operators can have different levels of access to the system. For example, certain operators may only be capable of viewing selected information, while other operators may be capable of changing various parameters that actually affect operation of the satellite communication system. Accordingly, depending on the authorization level of the operator, actual changes can be made to address problems that are occurring within the satellite communication system.

As illustrated in FIG. 1, the system 100 further includes a base station 120, and a radio frequency transmitter (RFT)

122. The base station 120 integrates communication between different user terminals 140 by way of a satellite 130. The base station is configured to interface with the various external networks (not shown) in order to convert various formats of information into a specific format for transmission/reception to/from the satellite 130. By way of example, the external networks can be terrestrial based networks such as a mobile (or wireless) network, a data network, a telephony network, etc. Accordingly, various embodiments provide for configuring the base station 120 to receive information that is formatted in accordance with various different types of protocols, and integrate them into an appropriate format for communicating with the satellite 130. The RFT 122 subsequently performs the actual transmission and reception of the information between the satellite 130.

Figure 2:
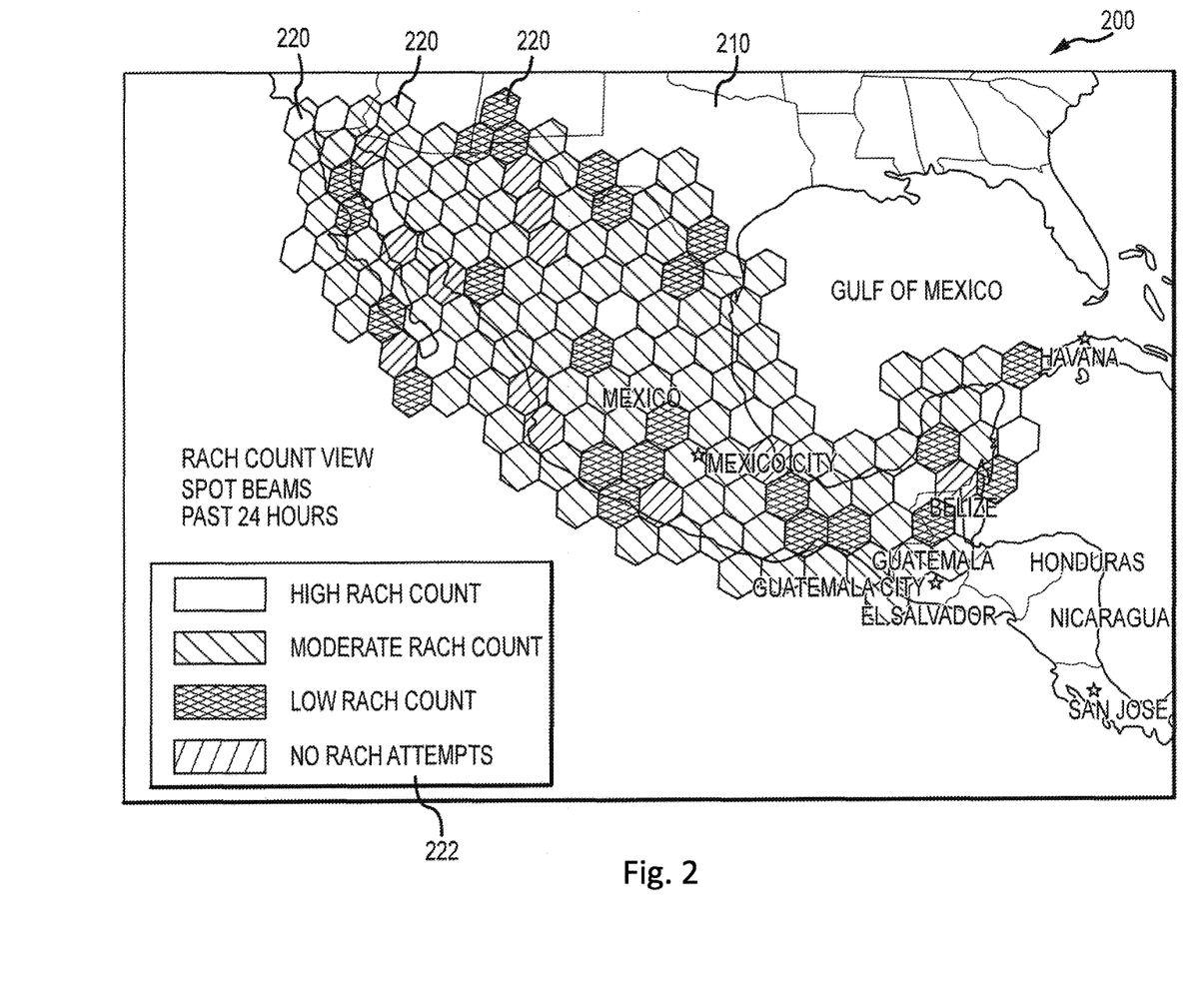
FIG. 2 is an illustration of a display for viewing operations in the satellite communication system, according to an embodiment.

FIG. 2 illustrates an exemplary display 200 for viewing operations in the satellite communication system, according to an embodiment. As illustrated in FIG. 2, the display 200 includes a layout of a map 210 which represents the satellite coverage area. The map 210 can be configured to include various topography features of the coverage area, as well as other geographical information such as, for example, city, state, etc. The map 210 also includes a plurality of coverage beams 220 that are overlaid on the map 210 to represent the satellite coverage area. Each beam 220 (or coverage beam) represents a specific coverage portion within the satellite coverage area. Thus, by incorporating all of the beams 220 (or coverage beams) over the map 210, a representation of the satellite coverage area can be displayed for the operator.

According to one or more embodiments, information for displaying the map 210 can be obtained from various sources, including but not limited to, open source repositories, proprietary systems, etc. Additionally, information pertaining to the size and location of individual beams 220 can be obtained, for example, from the base station 120 or various subsystems within the satellite communication system. According to various embodiments, the individual beams 220 can incorporate colors selected from a particular color scheme in order to provide status information for any particular beam 220. For example, the beams 220 can be configured to provide information corresponding to metrics received from at least one subsystem within the base station. According to various embodiments, however, metrics can also be obtained from subsystems (not shown) that are remotely located from the base station 120. Such subsystems can include, for example, intermediate systems interposed between the base station 120 and RFT 122.

According to the exemplary display 200 illustrated in FIG. 2, a legend 222 can be provided for indicating the status information for each beam 220. The display 200 is configured such that the beams 220 provide information related to the random access channel (RACH) count within the satellite communication system. Thus, depending on the color applied to each individual beam 220, an operator can interpret the RACH count within each individual beam 220 within the satellite coverage area. Furthermore, as previously discussed, specific metrics related to the RACH count can be retrieved from subsystems such as the base station 120, or other subsystems.

Figure 3:
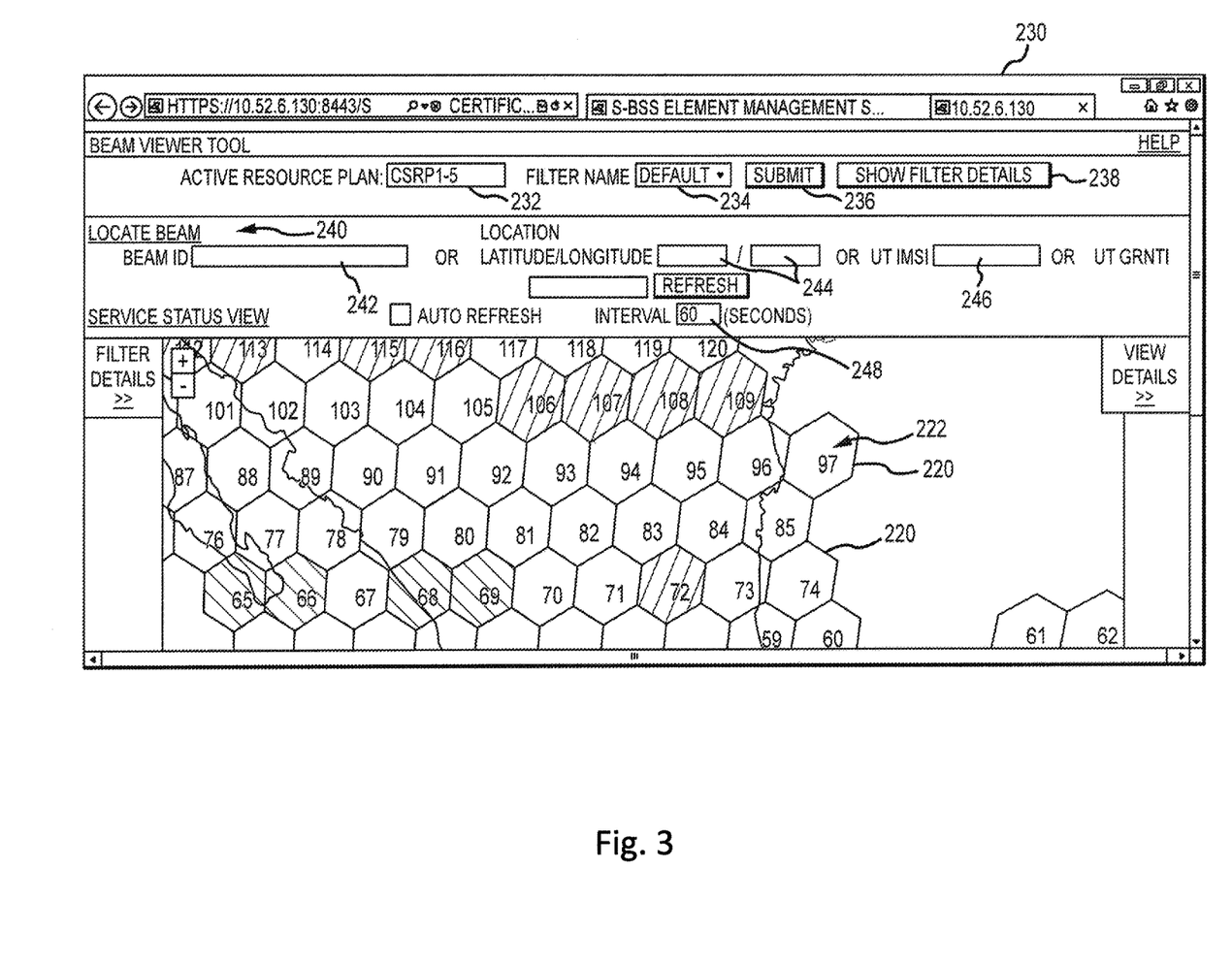
FIG. 3 is a diagram of a display illustrating various displayable details, according to one or more embodiments.

FIG. 3 is an exemplary display 230 for illustrating details and configurations, according to an embodiment. As illustrated in FIG. 3, an operator can obtain various details related to individual beam 220 that are displayed on the map. Additionally, depending on the operator's access level, various filter parameters can be adjusted for customizing the information obtainable from the individual beams 220. The display 230 includes an enlarged portion of the satellite coverage area and provides additional information for the beams 220. For example, each beam 220 has been identified with a corresponding beam number 224. Additional information can be obtained regarding each specific beam 220 within the displayed area, depending on the various filter parameters, by enlarging the coverage area and/or scrolling to different regions. According to one or more embodiments, the type of beam 220 used to overlay the map 210 of the satellite coverage area can vary. Using the filter parameters, for example, an operator can select both a standard beam and a micro beam. The level of detail available can be configured to prioritize the standard beam. By enlarging the map 210, however, details pertaining to specific micro beams within individual standard beams can become available to the operator.

According to at least one embodiment, the display 230 can provide additional information to the operator such as an active resource plan and a particular filter being used. The operator also has an option to enter a specific resource plan within the active resource plan entry area 232 in order to activate a new resource plan for resolving a particular problem. As previously discussed, depending on the access level of the operator specific changes to the system may not be allowed. Thus, only operators having the requisite access level would be capable of activating a new resource plan. The operator is also capable of changing the filter being applied for displaying the metrics using the filter drop down menu 234. The filter drop down menu 234 can provide access to various predefined filters that are available for a session. More particularly, according to at least one embodiment, the predefined filters can be applied by any operator regardless of access level. The predefined filters, however, cannot be modified. According to other embodiments, however, the predefined filters can include filters that have been created and stored by the operator.

Once the filter selection has been made, the operator can select the submit button 236 in order to apply the filter to the current display. Additionally, the operator can select the show filter details button 238 in order to create and/or modify a desired filter, as will be discussed in greater detail below. The display 230 also provides the operator with an ability to immediately identify the location of a particular beam 220 using the locate beam button 240. This can be done, for example, in conjunction with the beam ID entry box 242. According to an embodiment, the operator can utilize the beam ID entry box 242 in order to enter the specific beam number 224 of one or more beams 220 to be identified on the display 230. For example, if the operator enters 89, 90, 91 in the beam ID entry box 242, then the three beams corresponding to those beam numbers would be immediately highlighted on the display 230.

According to various embodiments, the selected beams can be identified using a different color variation, a rapidly changing color variation (e.g., blinking), or by automatically zooming the displayed portion of the coverage area to only encompass the selected beams. Additionally, the level of zoom can be set by the operator in advance. According to other embodiments, the operator can enter information corresponding to the coordinates of a particular beam or a particular handset (e.g. user terminal) based on latitude and longitude at entry boxes 244 or based on specific user terminal information such as the IMSI at entry box 246. The display 230 can also be set to automatically refresh information at a predetermined interval that is set at entry box 248. As illustrated in FIG. 3, the automatic refresh interval is set for 60 seconds at entry box 248. Accordingly, metrics corresponding to the filter being applied would be retrieved and updated every 60 seconds, and the display 230 would be refreshed in order to reflect any changes.

Figure 4:
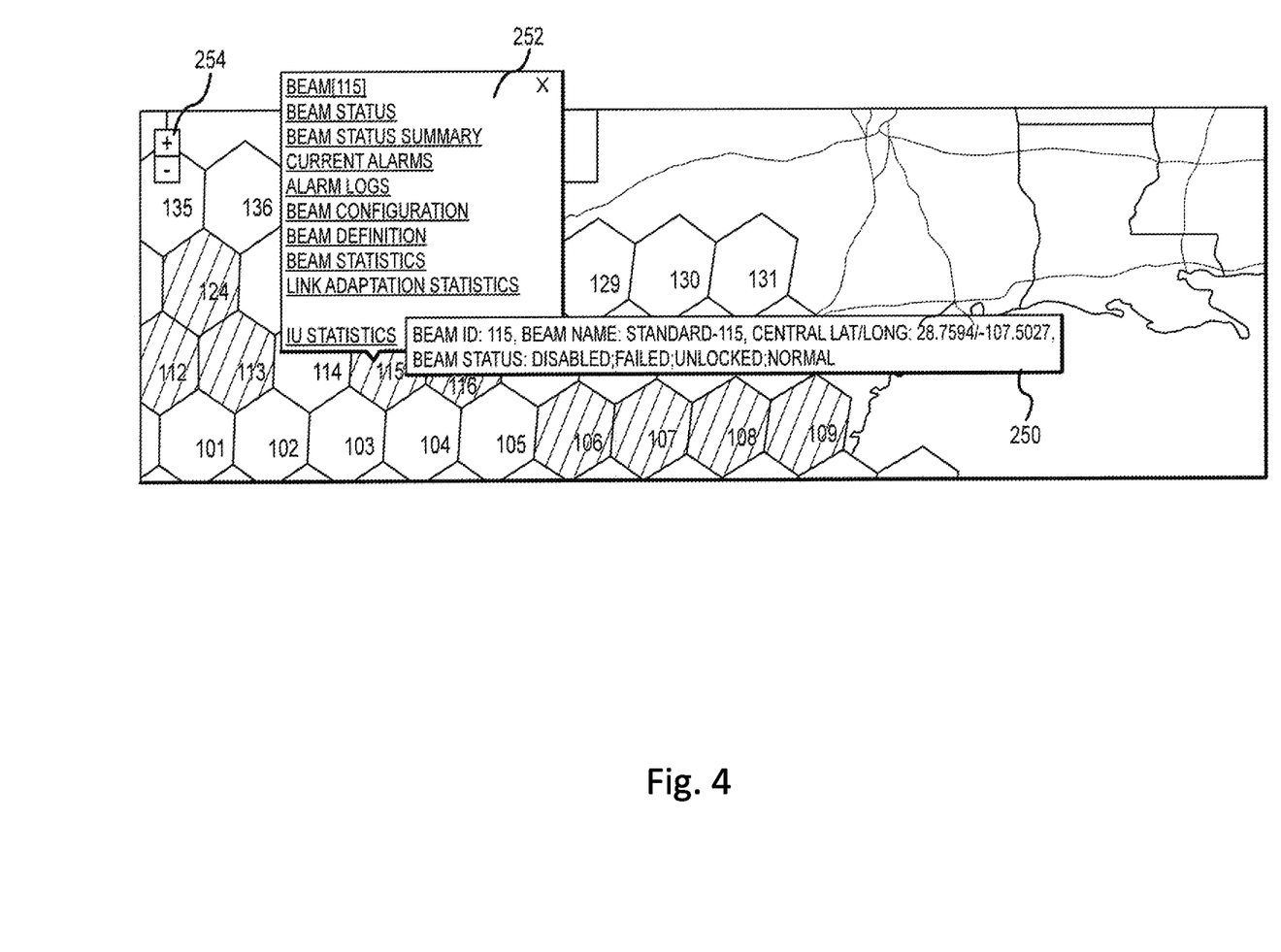
FIG. 4 is a diagram of a display for providing further details, according to at least one embodiment.

FIG. 4 illustrates a display for providing further details, according to at least one embodiment. Such details can be displayed to the operator while reviewing and/or analyzing the status information. For example, by hovering a pointer or selection device (e.g., mouse, stylus, etc.) over a particular beam, a floating display 250 can appear to provide specific information regarding the selected beam. For example, FIG. 4 indicates that the selection device has been hovered, or placed, over beam number 115. Thus, the floating menu 250 provides information corresponding to the beam ID, the specific type of beam being used to overlay the coverage map, latitude and longitude coordinates for the beam, as well as the beam status.

According to other embodiments, a pop-up menu 252 can be displayed by selecting a particular beam. Such selection can correspond, for example, to an active selection such as a click from the input device. It should be noted, however, that the manner of performing the active selection can vary depending on the specific device. Furthermore, selection can be made by touch if the display device accepts such input. As illustrated in FIG. 4, beam number 115 has been actively selected. Accordingly, the pop-up menu provides information such as the beam number, beam status, beam status summary, current alarms, alarm logs, beam configuration, beam definition, beam statistics, and link adaptation statistics. According to various embodiments, the information provided in the pop-up menu 252 can also be customized by the operator. According to additional embodiments, the information within the pop-up menu 252 can be provided, for example, in the form of hypertext links that allows the operator to open or jump to locations where such information can be examined and/or modified. Thus, the operator is capable of quickly obtaining detailed information regarding specific beams, and further jumping to specific locations for more detailed analysis of the beam status.

Figure 5:
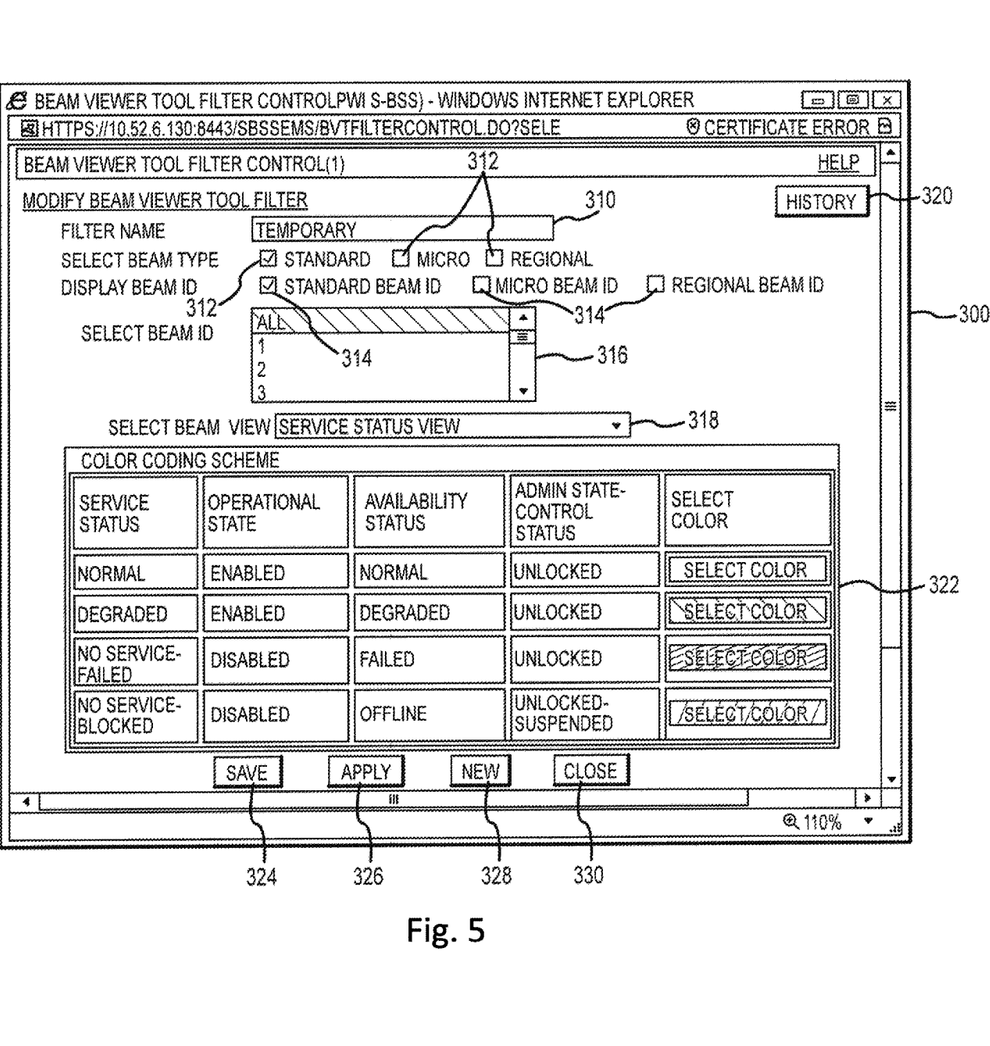
FIG. 5 is a diagram illustrating a filter control screen, in accordance with an embodiment.

FIG. 5 illustrates a filter control screen 300, in accordance with an embodiment. The filter control screen 300 allows an operator to set various conditions for modifying and/or creating filters to select specific information from the metrics retrieved from the subsystems. For example, the filter control screen 300 includes filter name entry box 310 allows the operator to select the name of a particular filter to be retrieved or created. Depending on the operator's access level, only a specific number of filters may be available. Additionally, the operator's access level can determine whether new filters can be created and applied. The beam type selection boxes 312 allow the operator to identify one or more beam types to be displayed on the satellite coverage area. For example, the operator can select a standard beam, a micro beam, a regional beam, or any combination thereof to be displayed on the satellite coverage area. Thus, depending on the selections made by the operator, a regional beam can be displayed with the standard beams available within the area encompassed by the regional beam. Furthermore, one or more micro beams can be displayed within each standard beam. Thus, an operator can selectively apply the specific beam type required to analyze the selected metrics.

According to one or more embodiments, the operator can further indicate whether the ID (or number) corresponding to any beam type will be displayed in addition to selecting a particular beam type to be displayed. This can be done, for example, using the display beam ID selection boxes 314 to indicate whether the ID for standard beams, micro beams, regional beams, or any combination thereof should be displayed. For example, if the operator only selects the option to display the ID corresponding to standard beams, then only the beam ID for standard beams would be displayed. Micro beams or regional beams would still be displayed, but their corresponding beam ID would not be displayed. According to such embodiments, the operator can display multiple beam types within the coverage area without unnecessarily cluttering the display with numbers (or ID) corresponding to each type of beam.

The filter control screen 300 also allows the operator to select one or more specific beams to be displayed based on their particular ID. For example, drop-down menu 316 allows the operator to scroll through all of the available beams and select one or more to be displayed. Additionally, the operator can simply select "all" beams available for the satellite communication systems. A select beam view drop down menu 318 can be provided in order to allow the operator to select a specific beam view. According to at least one embodiment, the different beam views can include: service status, alarm status, control carrier definition, traffic carrier definition, carrier bandwidth definition, carrier frequency reuse, RACH activity, blocked service attempts, connected UTs, service type activity, service type traffic activity, radio link failures, link quality, and UT beam handover.

According to one or more embodiments, the operator can configure the filter to provide a time-lapsed view of selected metrics. This can be accomplished, for example, by selecting the history button 320. More particularly, various embodiments provide for collection and storage of all metrics at predetermined intervals (e.g., 15 minutes). Furthermore, the operator can change the predetermined interval based on the specific system. The metrics can be stored in various types of storage devices for subsequent access. Upon selecting the history button 320, the operator can be presented with one or more entry boxes (not shown) for setting a desired time interval. Metrics would then be retrieved for the selected time interval, and applied to the coverage beams.

According to at least one embodiment, instantaneous metrics can be retrieved directly from the various subsystems and the historical metrics can be retrieved from the storage device. The retrieved metrics can optionally be aggregated in order to obtain, for example, an average value for purposes of assigning a color code for the displayed coverage beams. According to further embodiments, by selecting and/or hovering over a particular coverage beam, a pop-up menu (not shown) can be presented to provide more detailed information. For example, the pop-up menu can allow the operator to select a chart or plot which provides information pertaining to one or more specific metrics over the selected time period. According to such embodiments, the operator can quickly view and analyze various trends related to, for example, beam load variations over time. The operator can optionally use such information to reallocate resources in order to balance the load distribution across multiple beams.

A color scheme menu 322 can also be provided to allow the operator to select the specific color scheme that will be applied to represent different status information when displayed on the satellite coverage area. The filter control panel 300 also includes various control buttons to initiate and/or conclude various actions. For example, if the operator has appropriate access and has modified a particular filter, the save button 324 can be used to capture any changes. Alternatively, the operator may only desire to view the results of one or more changes. Under such circumstances, the operator can use the apply button 326 in order to see the result of the changes, without actually making changes to the filter. Additionally, if an operator does not have appropriate access to create or modify filters, the apply button 326 can be used to view the results of any changes without actually affecting the filter. The operator can optionally make various changes to an existing filter and/or set specific parameters and select the new button 326 to create a new filter based on an existing filter or simply the newly entered criteria. A name can be provided via the filter name entry box 310. Alternatively, the operator can be prompted to enter a name for the filter upon selecting the new button 328. Once the operator has finished making changes in the filter control panel 300, the close button 330 can be used to close the filter control menu and return, for example, to the satellite coverage area display.

Figure 6A:
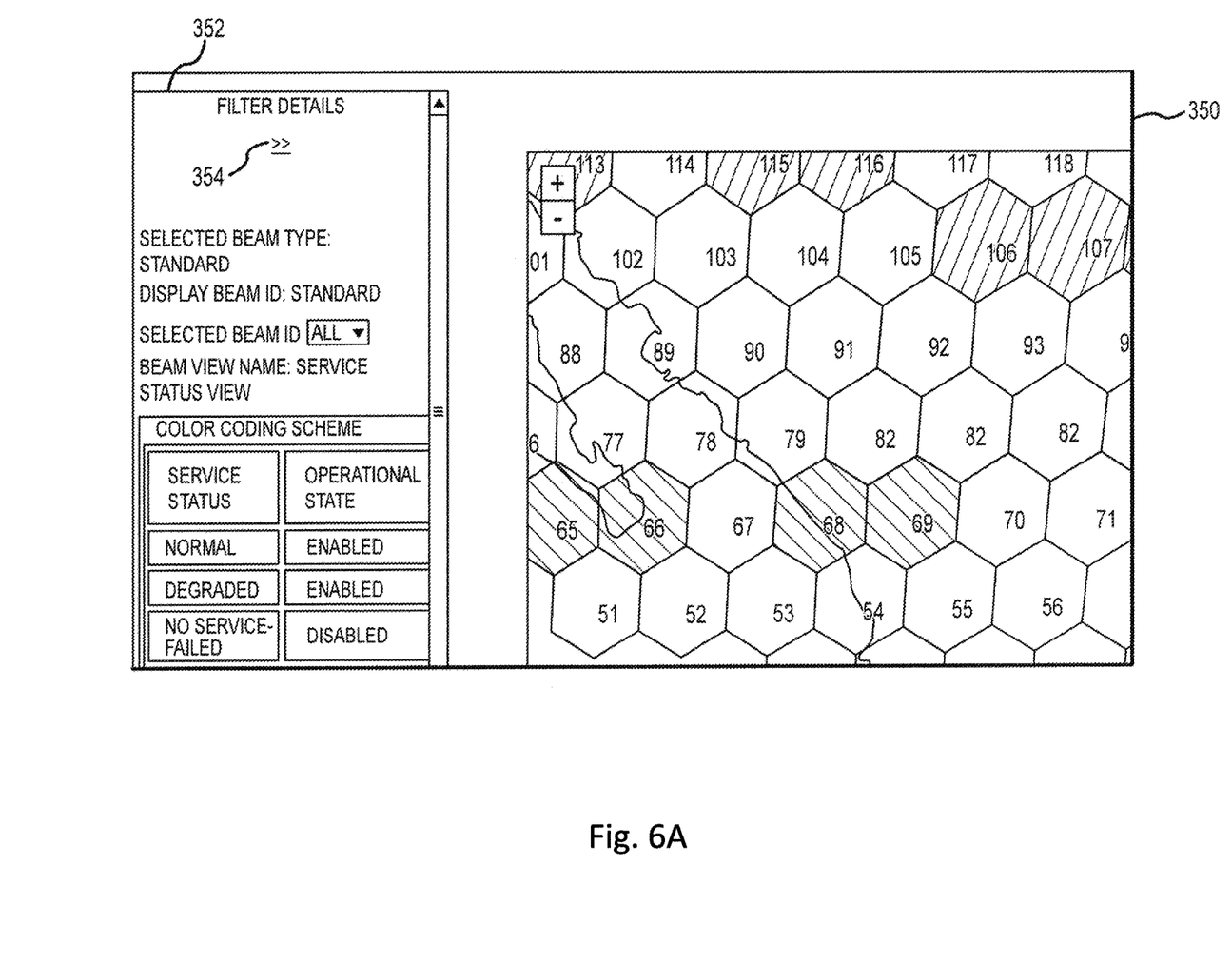
FIG. 6A is a diagram of a display for providing details, in accordance with at least one embodiment.
Figure 6B:
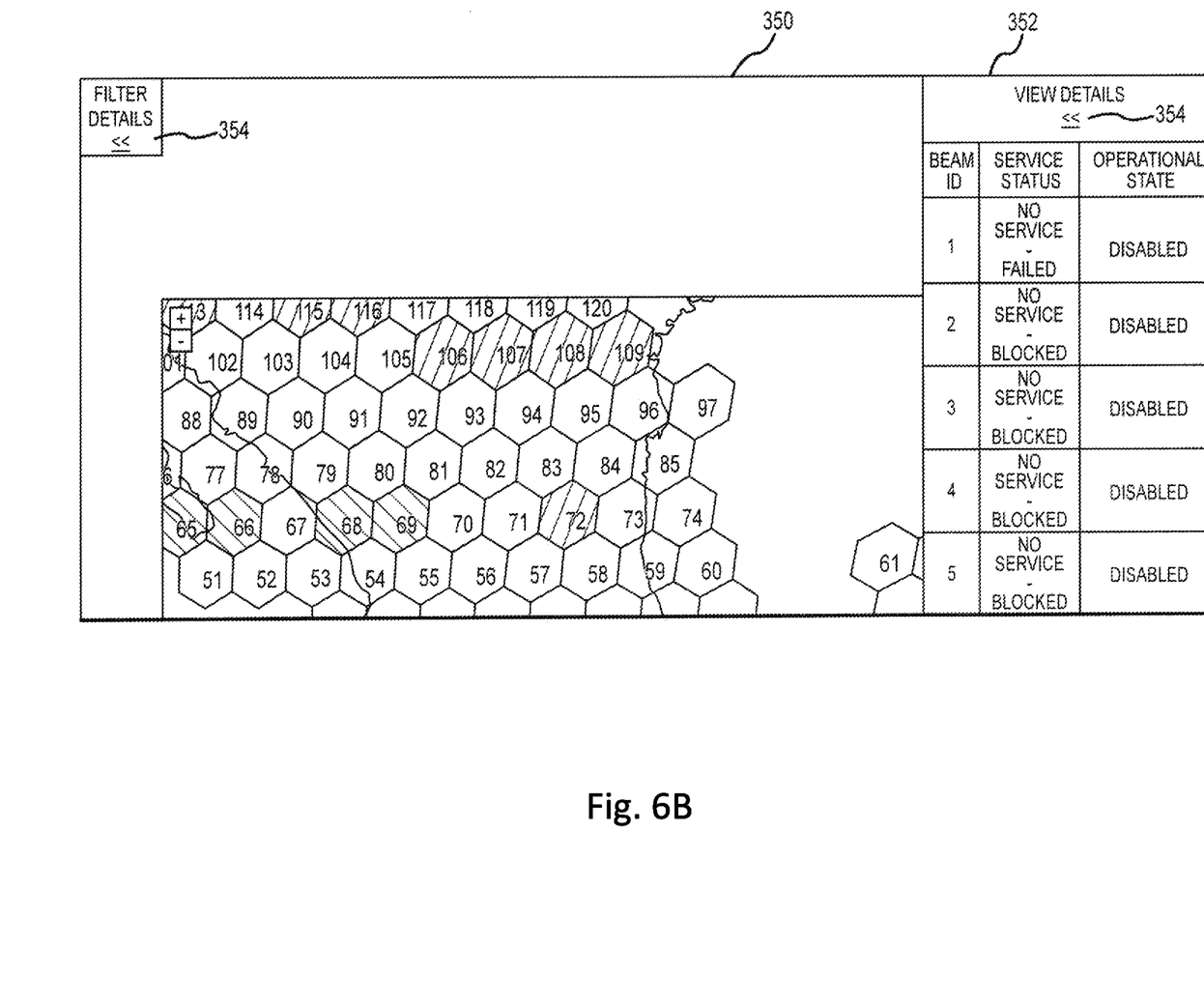
FIG. 6B is a diagram of a display for providing details, in accordance with an embodiment.

FIGS. 6A and 6B illustrate displays for providing details, in accordance with at least one embodiment. As illustrated in FIG. 6A, the display 350 can include a filter details area 352 which allows the operator to make various changes to the filter without the need to actually return to the filter control menu. The filter details area 352 can be accessed, for example, using and expand/contract link 354. When the filter details area 352 is displayed, the operator can change various criteria to be applied to the metrics and immediately see the results on the display 350. Once the selections to the filter details menu have been completed, link 354 can be selected to contract the menu, as shown in FIG. 6B. The operator also has an option to display a view details area 362 by using another expand/contract link 364. The view details area 362 allows the operator, for example, to scroll through the different beams currently displayed. The operator is also capable of obtaining status information such as, for example, service status and operational state. Once the operator has completed use of the view details area 362, it can be contracted using link 364.

Figure 7:
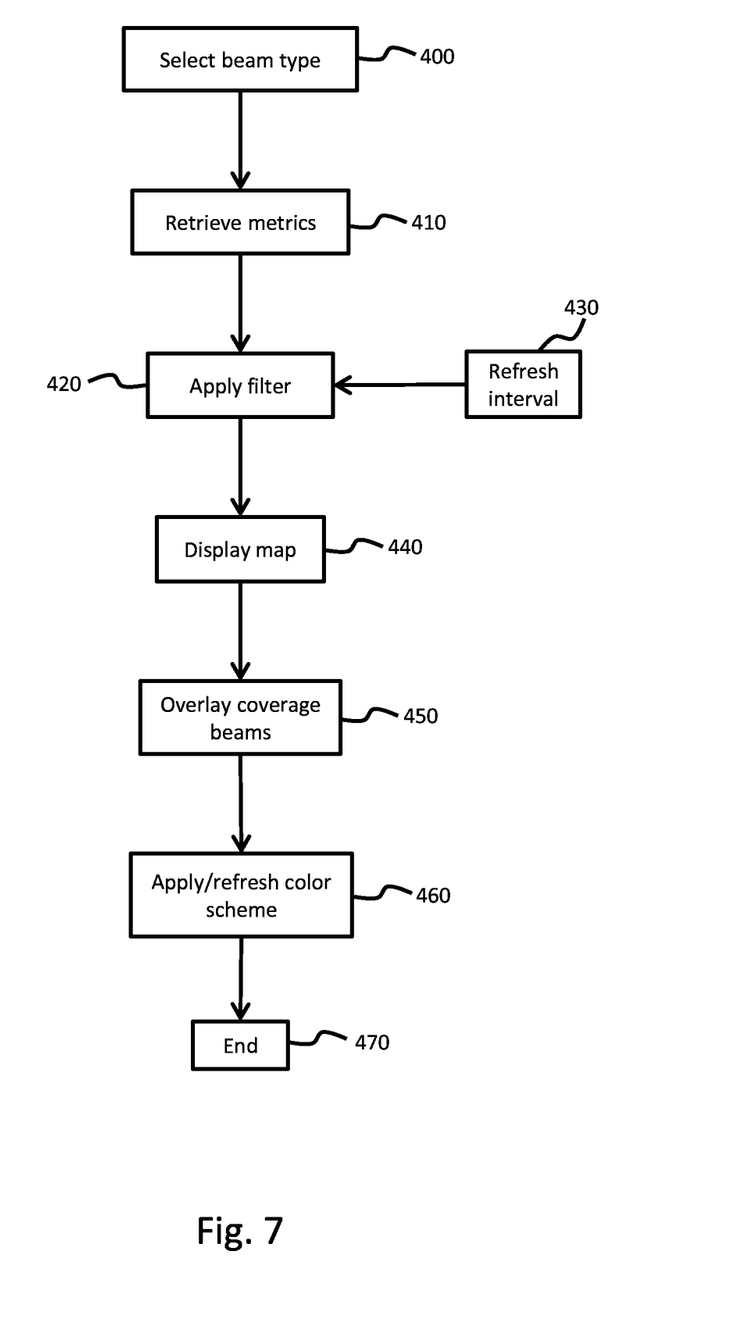
FIG. 7 is a flowchart illustrating the steps for viewing operations in a satellite communication system, in accordance with at least one embodiment.

FIG. 7 is a flowchart illustrating the steps for viewing operations in a satellite communication system, in accordance with at least one embodiment. At 400, a beam type is selected, for example, by the operator. This corresponds to selection of the type of beam to be subsequently displayed to represent the satellite coverage area. As previously discussed, various types of beams can be selected for display. The operator can select micro beams, regular beams, and regional beams. Furthermore, the operator can select any combination of beam types to be displayed. At 410, metrics are retrieved from various subsystems in the satellite communication system. At 420, a filter is applied to the metrics. As previously discussed, the filter corresponds to various criteria which the operator can select to be applied in order to display the most appropriate information for analysis. For example, the filter can allow the operator to select information such as, service status, alarm status, control carrier definition, traffic carrier definition, carrier bandwidth definition, carrier frequency reuse, random access channel activity, blocked service attempts, connected user terminals, service type activity, service type traffic activity, radio link failures, link quality, and UT beam handover.

At 430, the operator can optionally enter a refresh interval for updating the metrics. According to one or more embodiments, the metrics would be retrieved periodically in order to maintain the current status in real time. At 440, a map of the geographic area is displayed. At 450, the map is overlaid with the coverage beams selected by the operator. The coverage beams, therefore, are displayed in correspondence to the actual geographic areas that each specific beam covers. According to one or more embodiments, if a refresh interval is selected at 430, then the coverage beams are refreshed based on the updated metrics that are retrieved at the refresh interval. At 460, the color scheme is applied in order to provide the appropriate status information corresponding to each of the coverage beams within the satellite coverage area. As previously discussed, the status information is determined, for example, based on the metrics that are retrieved from the various subsystems. The process then ends at 470.

It should be noted, however, that although the process is indicated as ending at 470, one or more embodiments provide for continued analysis whereby the operator can make various changes to the filters in order to obtain different status information. Furthermore, if a refresh interval is selected, then the metrics would be periodically retrieved and the color scheme would be refreshed in accordance with the selected refresh interval. Accordingly, such embodiments would also allow the process to continue rather than ending at 470.

Figure 8:
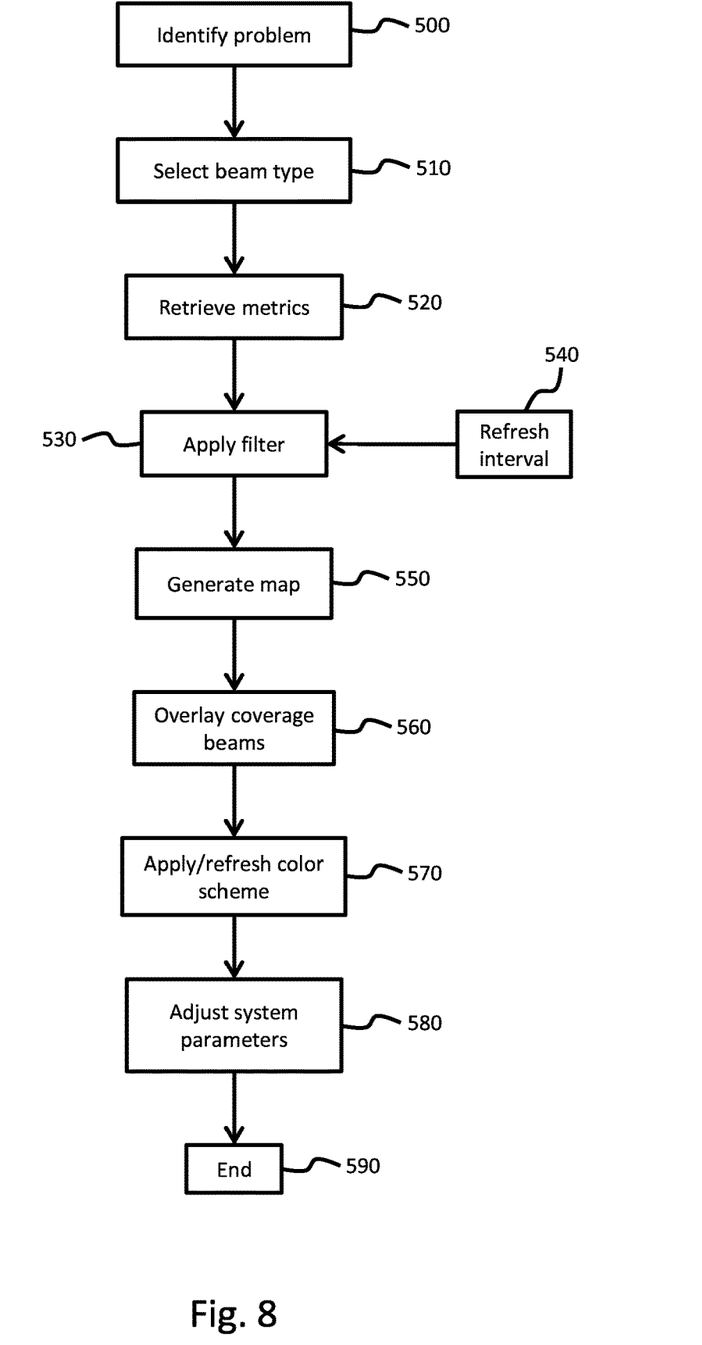
FIG. 8 is a flowchart illustrating a process for troubleshooting, in accordance with at least one embodiment.

FIG. 8 is a flowchart illustrating a process for troubleshooting, in accordance with at least one embodiment. At 500, a particular problem is identified within the system. According to various embodiments, problems can be identified based, for example, on calls received at a service center related to problems from various customers. For example, one or more customers may call the service center to indicate that they are unable to access the network within a particular geographic area. Problems can further be identified by an operator while continually monitoring the entire satellite coverage area and detecting congestion and/or a drop in RACH activity.

At 510, one or more different types of coverage beams are selected for representing different portions of the satellite coverage area. At 520, metrics are retrieved from the various subsystems. According to one or more embodiments, the system can be configured to allow the operator to specify specific subsystems from which the metrics should be obtained. This can be done based on, for example, the particular problem that has been identified. At 530, the filter is applied to the retrieved metrics. As previously discussed, the filter allows the operator to customize various criteria pertaining to the status information that will be displayed. According to one or more embodiments, at 540, the operator can optionally select a refresh interval to be applied. The refresh interval can specify the intervals at which the metrics are updated. At 550 the geographic map is generated. The coverage beams are then overlaid on the geographic map at 560. Depending on the specific embodiment, the coverage beams can be in the form of regular beams, micro beams, regional beams, or any combination thereof.

At 570, a color scheme is applied to the coverage beams in order to provide status information which corresponds to the retrieved metrics. According to one or more embodiments, if a refresh interval is selected at 540, then the color scheme would also be refreshed at the selected interval. At 580, various system parameters can be adjusted in order to address and/or resolve the problems that have been identified. For example, if the identified problem is determined to be the result of bandwidth overload, the operator can reallocate various communication assets to the area corresponding to the problem. For example, according to one or more embodiments, the operator can modify various parameters related to frequency re-use in order to address the bandwidth problems. The process then ends at 590.

According to various embodiments, the operator can continue to monitor the status information by continually refreshing the color scheme in order to determine whether the adjustments have resolved the problem. Control would therefore continually loop back to 570 in order to continually refresh the color scheme. Furthermore, the parameters initially adjusted at 580 may not resolve and/or properly address the problem. Thus, it may be necessary for the operator to adjust different and/or additional parameters in order to attempt to resolve the problem. Accordingly, the specific sequence shown in FIG. 8 should only be construed as exemplary, and not limiting in any way.

Figure 9:
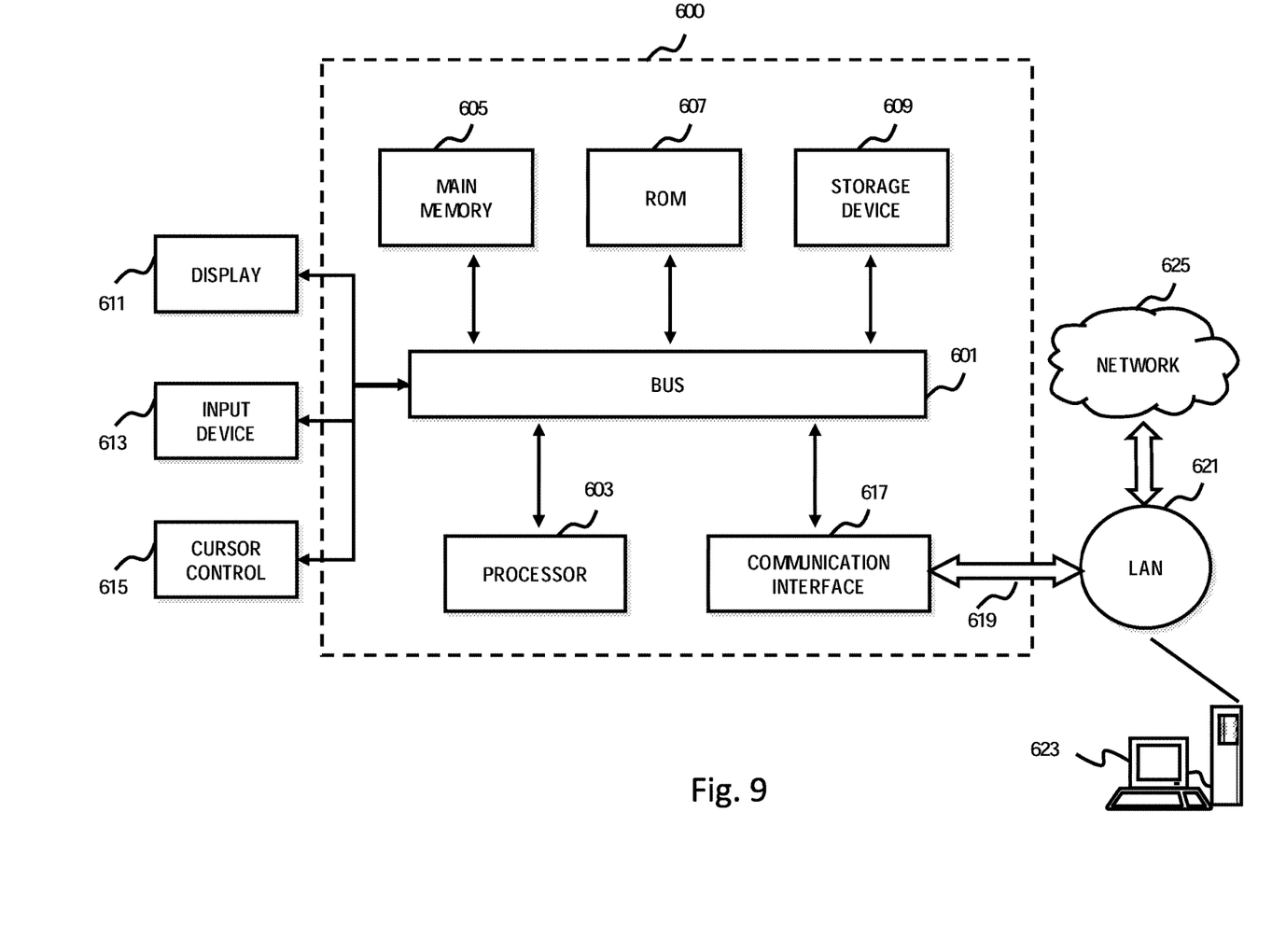
FIG. 9 is a diagram a computer system that can be used to implement various exemplary embodiments.

FIG. 9 is a diagram of a computer system that can be used to implement various embodiments. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a light emitting diode (LED) or other flat panel displays, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611. Additionally, the display 611 can be touch enabled (i.e., capacitive or resistive) in order facilitate user input via touch or gestures.

According to an exemplary embodiment, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement exemplary embodiments. Thus, exemplary embodiments are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a High Definition Multimedia Interface (HDMI), etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 such as a wide area network (WAN) or the Internet. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an exemplary embodiment through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Non-volatile media can further include flash drives, USB drives, microSD cards, etc. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a USB drive, microSD card, hard disk, optical disk (e.g., DVD, DVD RW, Blu-ray), or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a networking connection such as a cable modem or LAN card. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   selecting, for display on an operator workstation, a first beam type for representing a satellite coverage area, the first beam type being selected from one of a micro beam, a standard beam, and a regional beam;
   selecting, for display on the operator workstation, one or more second beam types for representing the same satellite coverage area, the one or more second beam types being selected from one of the micro beam, the standard beam, and the regional beam;
   retrieving metrics from at least one subsystem in a satellite communication system;
   displaying a map of the satellite coverage area;
   overlaying a plurality of coverage beams from each of the selected first beam type and one or more second beam types on the map in accordance with their respective coverage portions of the satellite coverage area;
   retrieving random access channel (RACH) activity for user terminals in the satellite coverage area over a predetermined time period;
   displaying information corresponding to the RACH activity within each coverage beam; and
   applying a color scheme to provide status information for each coverage beam corresponding to retrieved metrics, the status information being obtained, at least in part, from the retrieved metrics.

2. The method of claim 1, further comprising:
   applying a filter, to the retrieved metrics, by selecting desired criteria for use in the applying a color scheme; and
   reapplying the color scheme to update the status information.

3. The method of claim 2, where in the desired criteria includes one or more of: service status, alarm status, control carrier definition, traffic carrier definition, carrier bandwidth definition, carrier frequency reuse, blocked service attempts, connected user terminals, service type activity, service type traffic activity, radio link failures, link quality, and user terminal beam handover.

4. The method of claim 1, further comprising:
   selecting a screen refresh interval for retrieving metrics from the at least one subsystem; and
   dynamically adjusting colors from the color scheme to reflect real-time changes in the status information.

5. The method of claim 1, further comprising:
   selecting a desired coverage beam from the displayed map; and
   displaying a popup window containing status information for the selected coverage beam.

6. The method of claim 1, further comprising:
   entering last known coordinates for a selected user terminal; and
   resizing the displayed map to identify multiple coverage beams defining an estimated area including the last known coordinates,
   wherein the status information in the applied color scheme includes service status for the coverage beams within the estimated area.

7. The method of claim 1, further comprising:
   selecting a predetermined past interval for retrieving the metrics; and
   adjusting colors from the color scheme to reflect changes in the status information during the predetermined past interval.

8. An apparatus comprising:
   a base station for processing data within a satellite communication system and maintaining metrics for at least one subsystem within the satellite communication system; and
   a processor configured to:
      select, for display on an operator workstation, a first beam type for representing a satellite coverage area, the first beam type being selected from one of a micro beam, a standard beam, and a regional beam;
      select, for display on the operator workstation, one or more second beam types for representing the same satellite coverage area, the one or more second beam types being selected from one of the micro beam, the standard beam, and the regional beam;
      retrieve metrics from the at least one subsystem in a satellite communication system,
      display a map of the satellite coverage area,
      overlay a plurality of coverage beams from each of the selected first beam type and one or more second beam types on the map in accordance with their respective coverage portions of the satellite coverage area;
      retrieve random access channel (RACH) activity for user terminals in the satellite coverage area over a predetermined time period;
      display information corresponding to the RACH activity within each coverage beam; and
      apply a color scheme to provide status information for each coverage beam corresponding to retrieved metrics, the status information being obtained from the retrieved metrics.

9. The apparatus of claim 8, wherein the processor is further configured to:
   apply a filter, to the retrieved metrics, by selecting desired status information for use in the applying a color scheme; and
   reapply the color scheme to update the status information.

10. The apparatus of claim 9, where in the desired status information includes one or more of: service status, alarm status, control carrier definition, traffic carrier definition, carrier bandwidth definition, carrier frequency reuse, blocked service attempts, connected user terminals, service type activity, service type traffic activity, radio link failures, link quality, and user terminal beam handover.

11. The apparatus of claim 8, wherein the processor is further configured to:
   select a screen refresh interval for retrieving metrics from the at least one subsystem; and
   dynamically adjust colors from the color scheme to reflect real-time changes in the status information.

12. The apparatus of claim 8, wherein the processor is further configured to resize the displayed map to adjust a level of detail obtainable from the status information.

13. The apparatus of claim 8, wherein the processor is further configured to:
   select a desired coverage beam from the displayed map; and
   display a popup window containing status information for the selected coverage beam.

14. The apparatus of claim 8, wherein the processor is further configured to:
- receive last known coordinates for a selected user terminal; and
- resize the displayed map to identify multiple coverage beams defining an estimated area including the last known coordinates,
- wherein the status information in the applied color scheme includes service status for coverage beams within the estimated area.

15. The apparatus of claim 8, wherein the processor is further configured to:
- receive selection of a predetermined past interval for retrieving the metrics; and
- adjust colors from the color scheme to reflect changes in the status information during the predetermined past interval.

16. A method comprising:
- identifying at least one problem within a satellite communication system;
- selecting, for display on an operator workstation, a first beam type specifying beam coverage for an area corresponding to the at least one problem, the first beam type being selected from one of a micro beam, a standard beam, and a regional beam;
- selecting, for display on the operator workstation, one or more second beam types for specifying beam coverage for the same area corresponding to the at least one problem, the one or more second beam types being selected from one of the micro beam, the standard beam, and the regional beam;
- retrieving metrics corresponding to the at least one problem from at least one subsystem of the satellite communication system;
- generating a map of a geographical area associated with the at least one problem;
- overlaying a plurality of coverage beams from each of the selected first beam type and one or more second beam types on the map in accordance with their respective coverage portions of the area corresponding to the at least one problem;
- retrieving random access channel (RACH) activity for user terminals in the geographical area associated with the at least one problem over a predetermined time period;
- displaying information corresponding to the RACH activity within each coverage beam in the geographical area associated with the at least one problem;
- applying a color scheme to provide status information of coverage and/or performance related to the at least one problem based, at least in part, on the metrics; and
- adjusting one or more parameters in the satellite communication system based, at least in part, on the status information.

17. The method of claim 16, wherein the at least one problem includes service congestion, and further comprising:
- selecting a time interval for retrieving the metrics; and
- applying the color scheme based on the selected time interval,
- wherein the status information varies based on elapsed time.

18. The method of claim 17, wherein adjusting one or more parameters comprises reallocating communication assets to the area corresponding to the at least one problem.

19. The method of claim 17, wherein adjusting one or more parameters comprises modifying frequency reuse parameters for the area corresponding to the at least one problem.

* * * * *